US012621852B2

(12) United States Patent
    Du

(10) Patent No.: US 12,621,852 B2
(45) Date of Patent: May 5, 2026

(54) METHODS AND SYSTEMS FOR SAVING POWER IN SIDELINK COMMUNICATIONS

(71) Applicant: ZTE Corporation, Shenzhen (CN)

(72) Inventor: Weiqiang Du, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 341 days.

(21) Appl. No.: 18/352,157

(22) Filed: Jul. 13, 2023

(65) Prior Publication Data

US 2023/0362963 A1     Nov. 9, 2023

Related U.S. Application Data

(63) Continuation of application No. PCT/CN2021/071912, filed on Jan. 14, 2021.

(51) Int. Cl.
    *H04W 72/40*      (2023.01)
    *H04W 72/25*      (2023.01)
    *H04W 72/543*     (2023.01)
    *H04W 76/28*      (2018.01)

(52) U.S. Cl.
    CPC .......... *H04W 72/40* (2023.01); *H04W 72/25* (2023.01); *H04W 72/543* (2023.01); *H04W 76/28* (2018.02)

(58) Field of Classification Search
    CPC ... H04W 72/40; H04W 72/25; H04W 72/543; H04W 76/28; H04W 72/56; H04W 72/02; H04W 76/14; H04W 52/0248; H04W 72/0446; H04W 72/1263; H04W 72/569; H04W 92/18; H04L 1/1812; Y02D 30/70

USPC .......................................................... 455/450
See application file for complete search history.

(56) References Cited

U.S. PATENT DOCUMENTS

| | | | |
|---|---|---|---|
| 2020/0229171 A1 | 7/2020 | Khoryaev et al. | |
| 2021/0058866 A1* | 2/2021 | Hosseini | H04W 52/0235 |
| 2021/0227465 A1* | 7/2021 | Kung | H04W 76/28 |
| 2022/0346011 A1* | 10/2022 | Hong | H04W 52/02 |
| 2023/0164696 A1 | 5/2023 | Yang | |
| 2023/0262738 A1* | 8/2023 | Loehr | H04W 52/0216 |
| | | | 370/329 |
| 2023/0276525 A1* | 8/2023 | Zhang | H04W 76/28 |
| | | | 370/329 |

FOREIGN PATENT DOCUMENTS

| | | |
|---|---|---|
| CN | 107241786 A | 10/2017 |
| CN | 111567070 A | 8/2020 |

(Continued)

OTHER PUBLICATIONS

International Search Report and Written Opinion for PCT Appl. No. PCT/CN2021/071912, mailed Oct. 11, 2021 (6 pages).

(Continued)

*Primary Examiner* — Don N Vo
(74) *Attorney, Agent, or Firm* — Foley & Lardner LLP

(57)     ABSTRACT

Methods, apparatus, and systems for saving power among UE in sidelink communications are described herein. The disclosure provides various systems and methods for selecting sidelink resources, and determining whether destination sources are in active time. The disclosure further provides various systems and methods for starting and restarting timers for wireless devices to improve upon communications in sidelink communication systems.

20 Claims, 13 Drawing Sheets

702

704

(56)                    References Cited

FOREIGN PATENT DOCUMENTS

CN          113225847  A      8/2021
WO    WO-2018/064477  A1      4/2018

OTHER PUBLICATIONS

Extended European Search Report for EP App. No. 21918466.0 dated Jan. 22, 2024 (9 pages).
LG Electronics, "Discussion on physical layer design considering sidelink DRX operation," 3GPP TSG RAN WG1 #103-e, R1-2007897, E-meeting, Oct. 26-Nov. 13, 2020 (15 pages).
Asustek, "Discussion on SL DRX impact on physical layer", 3GPP TSG RAN WG1 #103-e, R1-2008500, Nov. 13, 2020, e-Meeting (3 pages).
InterDigital, Inc., "On multi-carrier and DRX operation for SL", 3GPP TSG RAN WG1 #103-e, R1-2009123, Nov. 13, 2020, e-Meeting (2 pages).
Office Action for KR Appl. No. 10-2023-7024228, dated Sep. 22, 2025 (with English translation, 5 pages).

* cited by examiner

TX UE sends communication to RX UE

302

RX UE sends feedback to TX UE

304

TX UE determines if timers started correctly

306

METHODS AND SYSTEMS FOR SAVING POWER IN SIDELINK COMMUNICATIONS

CROSS-REFERENCE TO RELATED APPLICATION

This application claims the benefit of priority under 35 U.S.C. § 120 as a continuation of PCT Patent Application No. PCT/CN2021/071912, filed on Jan. 14, 2021, the disclosure of which is incorporated herein by reference in its entirety.

TECHNICAL FIELD

This disclosure is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for communicating in an in a sidelink deployment for New Radio (NR).

In an aspect, wireless device selects a sidelink communication based on an active time of a destination and uses the selected resource for sidelink communication. In an aspect, the wireless determines whether the destination is in the active time according to: (a) the resource, an initial transmission resource, a retransmission resource, or a period resource indicated by a Side Link Control Information (SCI) associated with the destination; (b) the resource, the initial transmission resource, the retransmission resource, or the period resource indicated by SCI or immediate last SCI associated with the destination; or (c) the resource, the initial transmission resource, the retransmission resource, or the period resource indicated by a prior SCI associated with the destination. In yet another aspect, the period resource further comprises first N period resources indicated by the SCI associated with the destination, wherein the first N period resources are used for determining. In yet another aspect, the period resource comprises a period resource in a current Discontinuous Reception (DRX) cycle that is indicated by the SCI associated with the destination, the period resource in the current DRX is used for the determining. In yet another aspect, the determining step is performed for a SCI with a feedback enable. In yet another aspect, the determining step is performed for a SCI with a Hybrid Automatic Repeat Request (HARQ) ACK or NACK. In yet another aspect, a Physical Sidelink Shared Channel (PSSCH) transmission is feedback disabled. In yet another aspect, the wireless device determines whether the destination is in the active time according to a specification configuration when a Media Access Controller (MAC) Protocol Data Unit (PDU)'s feedback is disabled or only NACK, the specification configuration includes whether a specific PC5 QoS Identifier (PQI) or Quality of Service (QoS) or Data Radio Bearers (DRB) or logical channel or Media Access Controller Control Element (MAC CE) or destination or User Equipment (UE) or priority or the resource pool is allowed to do so. In yet another aspect, determination is performed if the MAC PDU associated with the SCI only includes the data of PQI or QoS or DRB or logical channel or MAC CE or destination or UE or priority that is allowed to determine the destination in active time. In yet another aspect, the resource pool indicates that the destination in active time. In yet another aspect, the wireless device determines if the configuration includes a priority threshold, and wherein the logical channel priority within the MAC PDU associated with the SCI is higher than the threshold.

In another aspect, the wireless device selects an initial transmission resource on which the destination is in the active time. In yet another aspect, the selecting the initial resource excludes the resource where any destination is not in active time as indicated by physical layer resources. In yet another aspect, the selecting the initial resource is done randomly based on a transmission opportunity from remaining resources. In yet another aspect, the selecting the initial resource excludes the resource where any destination is not in the active time of a current DRX cycle as indicated by physical layer resources. In yet another aspect, the selecting the initial transmission resource where any destination is in active time. In yet another aspect, the selecting the initial transmission resource is done according to the DRX configuration of any destination. In yet another aspect, the selecting the initial transmission resource where any destination is in active time. In yet another aspect, the wireless device ensures that the following period resources spaced by the resource reservation interval is in the active time of any destination. In yet another aspect, the wireless device excludes the resources on which the destination with the highest priority logical channel is not in active time from the resources indicated by the physical layer. In yet another aspect, the wireless device selects the initial resource is done randomly based on a transmission opportunity from remaining resources. In yet another aspect, the wireless device the resource where the destination with the highest priority logical channel is not in the active time from the resources indicated by the physical layer. In yet another aspect, the wireless device selects the initial resource randomly based on a transmission opportunity from remaining resources. In yet another aspect, the wireless device excludes the resource on which the destination with highest priority logical channel is not in active time from the resources indicated by the physical layer. In yet another aspect, the wireless device selects the initial resource is done randomly based on a transmission opportunity from remaining resources. In yet another aspect, the wireless device excludes the resource where the destination with the highest priority logical channel is not in active time of the current DRX cycle from resources indicated by the physical layer. In yet another aspect, the wireless device selects the initial resource is done based on the resources where the destination with highest priority logical channel is in active time. In yet another aspect, the wireless device selects the initial resource is done based on the DRX configuration of the destination with the highest priority logical channel. In yet another aspect, the wireless device selects the initial resource where the destination with highest priority logical channel that is in the active time. In yet another aspect, the wireless device selects the initial resource is done by ensuring the following period resources are spaced by a resource reservation interval that is in the active time of the destination with the highest priority logical channel.

In an aspect, a wireless device selects a following transmission resource associated with the initial transmission resource. In yet another aspect, the wireless device selects a following transmission resource based on excluding the resource on which the any destination is not in active time from the resources indicated by the physical layer. In yet another aspect, the wireless device selects a following transmission resource based on excluding the resource where the destination is not in active time of the current DRX cycle from the resources indicated by the physical layer. In yet another aspect, the wireless device selects a following transmission resource based on randomly selecting a set of periodic resources spaced by the resource reservation interval from the remaining resources. In yet another aspect, the wireless device selects a following transmission resource based on selecting a set of periodic resources spaced by the resource reservation interval where any destination is in active time. In yet another aspect, the wireless device selects a following transmission resource based on selecting a set of periodic resources spaced by the resource reservation interval according to the DRX configuration of any destination. In yet another aspect, a wireless device selects a following transmission resource based on a prior selection of periodic resources spaced by the resource reservation interval where any destination is in active time. In yet another aspect, the wireless device selects a following transmission resource based on excluding the resource where the destination with highest priority logical channel is not in active time from the resources indicated by the physical layer. In yet another aspect, the wireless device selects a following transmission resource based on excluding the resource where the destination with the highest priority logical channel is not in the active time of the current DRX cycle from the resources indicated by the physical layer. In yet another aspect, the wireless device selects a following transmission resource based on randomly selecting a set of periodic resources that are spaced by the resource reservation interval from the remaining resources. In yet another aspect, the wireless device selects a following transmission resource based on selecting a set of periodic resources that are spaced by the resource reservation interval where any destination with highest priority logical channel is in the active time. In yet another aspect, the wireless device selects a following transmission resource based on selecting a set of periodic resources spaced by the resource reservation interval according to the DRX configuration of any destination with the highest priority logical channel. In yet another aspect, the wireless device selects a following transmission resource based on a prior selection of a set of periodic resources spaced by the resource reservation interval where any destination with highest priority logical channel is in active time.

In an aspect, the wireless device selects a retransmission resource. In yet another aspect, the retransmission resource is selected according to a DRX configuration of any destination. In another aspect, the transmission resource is selected where any destination is in active time. In yet another aspect, the retransmission resource is selected based on a prior selection of resources where any destination is in active time. In yet another aspect, the wireless device has a processor and a computer readable medium having a processor with executable code.

These, and other, aspects are described in the present disclosure.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

The disclosure relates to wireless systems. More specifically, it relates to communications between UE for side link communication, and for the scheduling of resources. Parameters are exchanged by one UE to another so that the UE can be configured.

Figure 1:
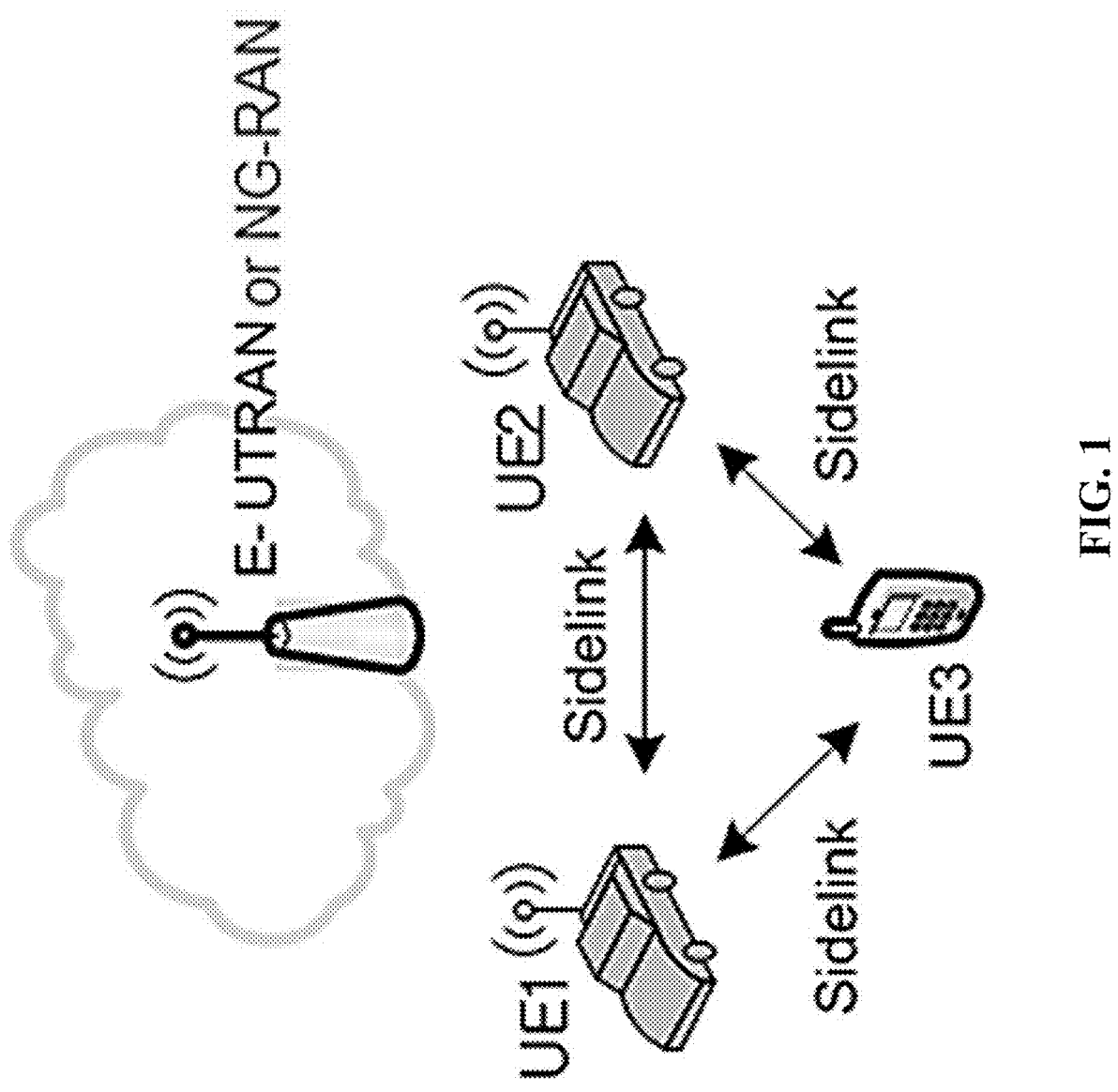
FIG. 1 illustrates an example V2X communication system.

FIG. 1 is a block diagram of an example V2X communication system. In the LTE (Long Term Evolution)-based V2X communications study organized by 3GPP, user-based devices (User Equipment) may communicate using V2X communication between a direct/sidelink link. For example, data may not be forwarded by the base station and the core network, and may be directly transmitted by the source UE to the target UE through an air interface (PC5 interface), as shown in FIG. 1.

With the advancement of communication technology and the development of the automation industry, the V2X communication scenario is further extended and has higher performance requirements. 3GPP has established research on vehicle networking communication based on advanced V2X services of the fifth-generation mobile communication technology (5G), including 5G air interface-based vehicle networking communication and 5G direct link (sidelink)-based vehicle networking communication.

It should be understood that any type of UEs can be used for the embodiments described herein, as known in the art, and that the specific hardware is not limited to the configurations described herein. It should also be understood that any configurations, and numbers, of networked devices can be used.

As described in TS 38.212, 213, 214, a UE can be configured to create a selected sidelink grant of resources. To do this it will: (1) determine the subchannel size, resource reserve interval, HARQ retransmission number; (2) perform an option sensing; (3) randomly select a transmission opportunity from resources indicated by physical layer; (4) use the randomly selected resource to select a set of periodic resources space by the resource reservation interval; and (5) use the randomly selected resource to select a set of periodic resources spaced by the resource reservation interval.

The format 1-A, for example, includes:

Priority—3 bits.

Frequency resource assignment $$-\left\lceil \log_2\left(\frac{N_{subChannel}^{SL}\left(N_{subChannel}^{SL}+1\right)}{2}\right)\right\rceil \text{ bits}$$

when the value of the higher layer parameter sl-MaxNumPerReserve is configured to 2; otherwise $$\left\lceil \log_2\left(\frac{N_{subChannel}^{SL}\left(N_{subChannel}^{SL}+1\right)\left(2N_{subChannel}^{SL}+1\right)}{6}\right)\right\rceil \text{ bits}$$

when the value of the higher layer parameter sl-MaxNumPerReserve is configured to 3.

Time resource assignment—5 bits when the value of the higher layer parameter sl-MaxNumPerReserve is configured to 2; otherwise 9 bits when the value of the higher layer parameter sl-MaxNumPerReserve is configured to 3.

Resource reservation period—$\lceil \log_2 N_{rsv\_period}\rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.

In an embodiment, a UE with DRX configuration is configured with some timers for a sidelink communication.

Figure 2:
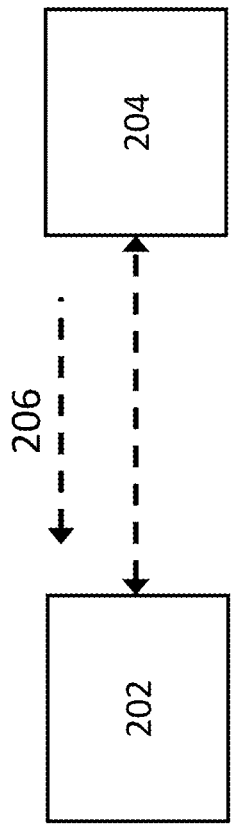
FIG. 2 illustrates communicatively coupled UEs.

FIG. 2 illustrates a TX UE 202 communicatively coupled with a RX UE 204, and the RX UE provides feedback 206. When DRX is configured, some timers are maintained for both the TX UE and the RX UE. In an embodiment, TX UE obtains RX UE's feedback to ensure that RX UE starts its timer successfully considering that some timers like transmission triggered timer are started/stopped by SCI or PSCCH transmission or PSSCH transmission when DRX is configured. Having TX UE obtain RX UE's feedback, it can determine if RX UE started its timer successfully. This prevents the TX UE from starting the timer incorrectly. In an embodiment, the usage of transmission triggered timer (e.g., transmission triggered timer, HARQ RTT timer, retransmission timer) needs to receive feedback from RX UE.

In an embodiment, the feedback includes one of HARQ feedback or HARQ ACK or NACK or MAC CE, RRC signaling or an indicator that can indicate the RX UE received the SCI successfully. In a unicast embodiment, when the TX UE receives a HARQ feedback from the RX UE, both the HARQ ACK and HARQ NACK can indicate that the RX UE receives SCI successfully. In an embodiment, the transmission triggered timer includes an transmission triggered timer, a or HARQ RTT timer, or a retransmission timer. In an embodiment, if UE is configured or determined to use DRX for a specific destination, all MAC PDUs are feedback enabled for the destination.

In an embodiment, groupcast is used, and the HARQ feedback includes at least options: (1) a HARQ ACK or NACK; or (2) HARQ NACK by itself. For HARQ NACK by itself, the RX UE that does not receive data successfully will send HARQ feedback. If the UE is configured or determined to use DRX for a specific destination, all MAC PDUs are feedback enabled and the HARQ information within the SCI includes ACK or NACK feedback for the destination.

In an embodiment, when DRX is used, the MAC PDUs are feedback enabled regardless of whether the logical channel within the MAC PDU is feedback enabled or disabled. In another embodiment, when DRX is used, a UE will be configured to either allow, or disallow, a enable feedback for the MAC PDU via RRC signaling or SIB or MAC CE or pre-configuration when DRX is used. In another embodiment, the corresponding configuration is configured per-PQI or QoS or LCH or DRB or MAC CE or destination or resource pool or UE or priority.

In another embodiment, when the MAC PDU does not include data of PQI or QoS flow or LCH or DRB or MAC or destination or UE or priority that is not allowed to enable feedback when DRX is used, MAC PDU is feedback enabled. In an embodiment, when the MAC PDU only includes data of PQI or QoS flow or LCH or DRB or MAC or destination or UE or priority that is allowed to enable feedback when DRX is used, the MAC PDU is feedback enabled.

In another embodiment, the corresponding configuration is configured per-resource pool and if the UE transmits the MAC PDU by using the resource pool which is allowed to enabled feedback when DRX is used, the MAC PDU is feedback enabled. In another embodiment, if the UE does not enable feedback for the MAC PDU when DRX is configured, the transmission triggered timer is not allowed to be used or started. In another embodiment, if the UE does not receive the feedback of the MAC PDU when DRX is configured, the transmission triggered timer is stopped. In another embodiment, if the UE is not allowed to enable feedback for MAC PDU for a specific destination when DRX is configured, transmission triggered timer is not allowed to be used or started for the destination.

In an embodiment, if all PQI/QoS flow/LCH/DRB/MAC/ destination/UE/priority are feedback disabled, transmission triggered timer is not used. In an embodiment, when DRX is configured, the UE selects the resource pool with a PSFCH resource. In another embodiment, the UE uses DRX, and transmission triggered timer/retransmission timer/HARQ RTT timer is not supported for feedback of the MAC PDU is HARQ only NACK.

Figure 3:
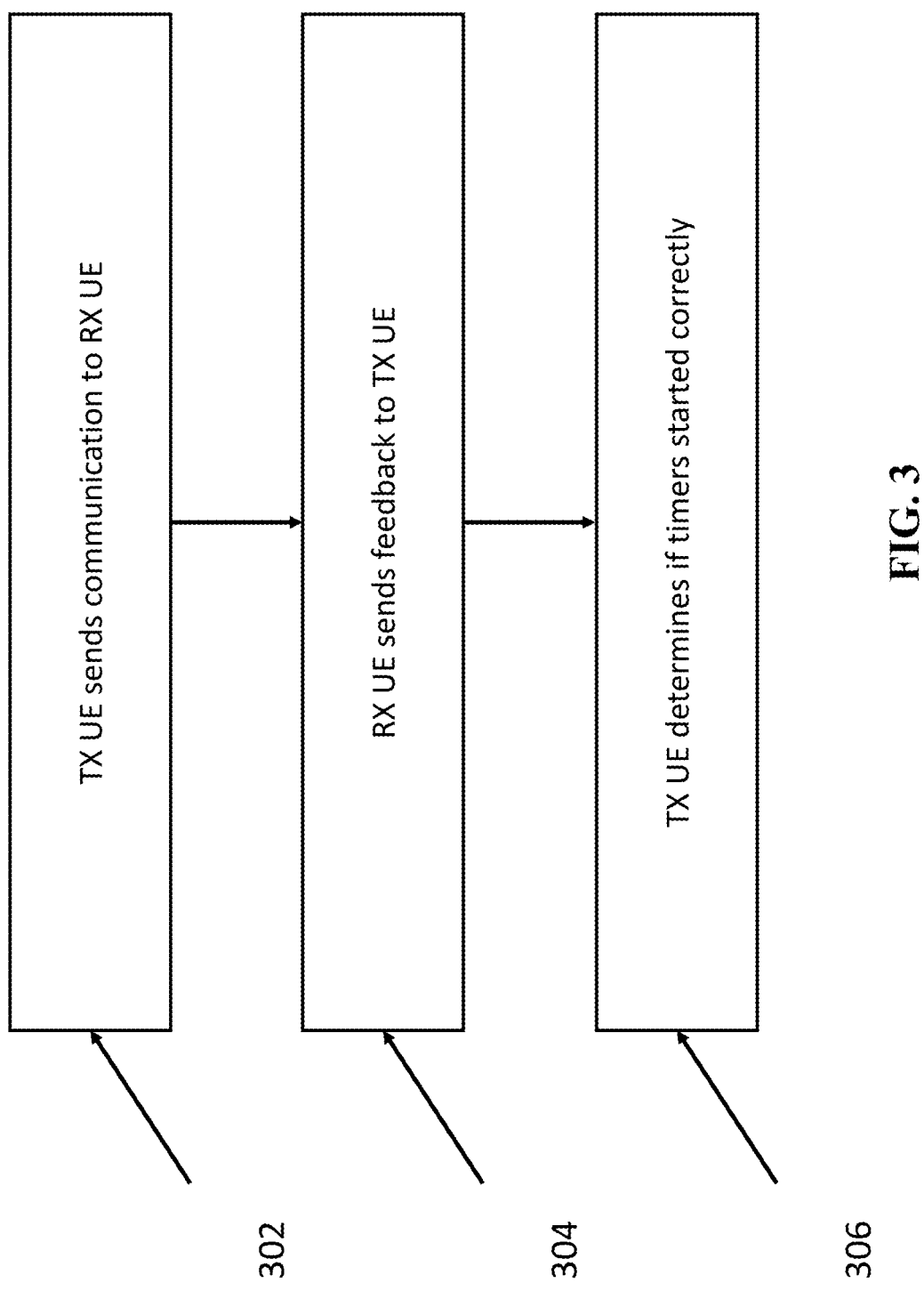
FIG. 3 illustrates a flowchart of determining if timers started correctly according to the embodiments of the disclosure.

FIG. 3 illustrates a flowchart of determining if timers started correctly according to the embodiments of the disclosure. In step 302, a TX UE sends communications to a RX UE. In step 304, the RX UE sends feedback to the TX UE. In step 306, the TX UE determines if the timers have been started correctly.

Figure 4:
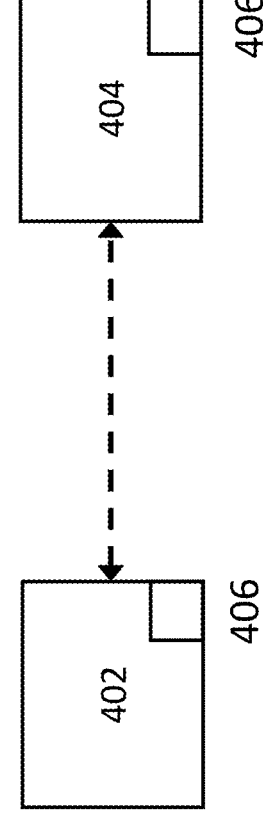
FIG. 4 illustrates communicatively coupled UEs.

FIG. 4 illustrates a TX UE 402 communicatively coupled with an RX UE 3404, each can have a transmission triggered timer 406. Either TX UE or RX UE can start, or restart, a transmission triggered timer if any of the following:

the PSSCH transmission/receiving occurs the PSSCH transmission/receiving corresponding to new transmission occurs the SCI transmission/receiving occurs the SCI corresponding to new transmission/receiving occurs the transmission/receiving of the MAC PDU occurs.

In an embodiment, for transmission triggered timer, it is started or restarted when transmission or receiving is feedback enabled. This can occur if any of the following:

the PSSCH transmitting or receiving occurs with a feedback enable the PSSCH transmitting or receiving occurs with a feedback enable corresponding to a new transmission the SCI indicates that feedback enabled transmitting or receiving occurs the SCI that indicates feedback enabled corresponding to new transmission/receiving occurs the transmitting or receiving of the MAC PDU occurs with feedback enabled.

In an embodiment, the SCI used in sidelink will indicate a retransmission resource and the period resource explicitly. In that embodiment, the timer can start or restart if any of the following:

the current slot or subframe is the resource indicated by SCI or immediate last SCI associated with the destination the resource indicated by the SCI or immediate last SCI associated with the destination as K, current slot or subframe is K-T, T is configured by a specific configuration.

In an embodiment, considering that a TCP PDU or a RLC AM PDU needs to receive feedback from peer UEs when the TX UE sends a new transmission SCI, TX UE will start the transmission triggered timer for receiving. The RX UE and starts the transmission triggered timer for transmission, TX UE also start the transmission triggered timer for receiving. This occurs if any of the following:

the PSSCH transmitting or receiving occurs the PSSCH transmitting or receiving corresponding to new transmission occurs the SCI transmitting or receiving occurs the SCI corresponding/transmission to new receiving occurs UE sends/receives the HARQ ACK feedback After the UE sends/receives the HARQ ACK feedback, UE wait a short time then start the transmission triggered timer. In one embodiment, After the UE sends/receives the HARQ ACK feedback, UE start a specific timer T, then start the transmission triggered timer when the timer T is expiry. In an embodiment, the time depends on UE process capability or transmission delay. In another embodiment, the time is configured by a specific configuration.

In an embodiment, when the PSSCH transmission is feedback disabled, the TX UE does not take into account about transmission reliability and whether the RX UE receives the SCI or data successfully. The TX UE can start the transmission triggered timer when transmission occurs if this is allowed or enabled by a specification configuration.

In an embodiment, the configuration includes whether a specific PQI or QoS or DRB or logical channel or MAC CE or destination or UE or priority or resource pool is allowed to start or restart the transmission triggered timer when MAC PDU is feedback disabled or HARQ only NACK.

In an embodiment, if the MAC PDU does not include the data of PQI or QoS or DRB or logical channel or MAC CE or destination or UE or priority that is not allowed to start or restarted with the transmission triggered timer, the UE can start or restart the transmission triggered timer when any condition described herein is met.

In one embodiment, if the MAC PDU includes the data of PQI or QoS or DRB or logical channel or MAC CE or destination or UE or priority that is allowed to start or restart the transmission triggered timer, the UE can start or restart the transmission triggered timer when any condition described herein is met.

In an embodiment, the UE can start or restart the transmission triggered timer when any condition described herein is met when resource pool is allowed to start or restart the transmission triggered timer.

In an embodiment, the configuration includes a priority threshold, if logical channel priority within the MAC PDU is higher than the threshold, the UE is allowed to start the transmission triggered timer.

Figure 5:
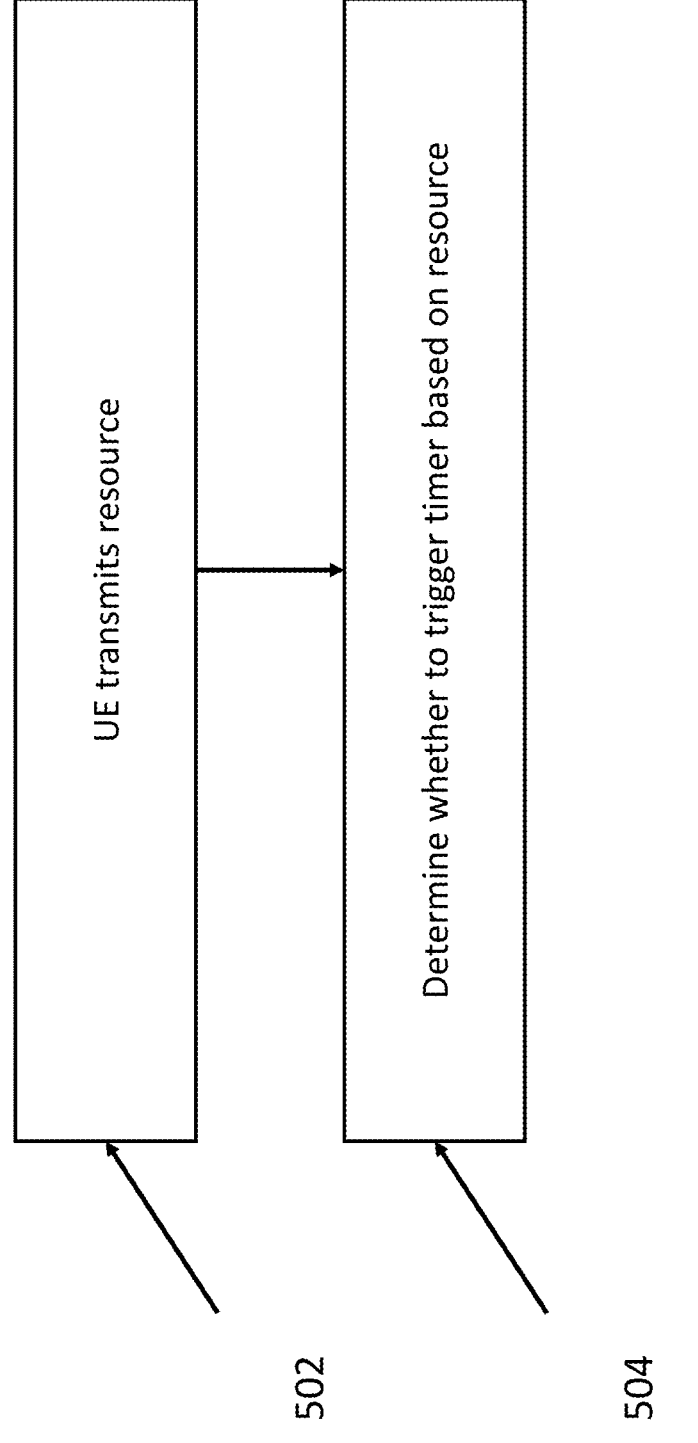
FIG. 5 illustrates triggering timers according to embodiments of the disclosure.

FIG. 5 illustrates triggering timers according to embodiments of the disclosure. In step 502, a UE transmits a data/SCI/PSCCH/PSSCH and, in step 504, a UE determines whether to trigger a timer based on the transmission.

Figure 6:
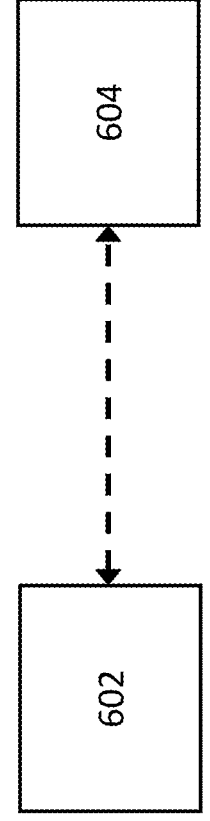
FIG. 6 illustrates two UEs.

FIG. 6 illustrates two UEs, a TX UE 602 and an RX UE 604. TX UE 4602 determines whether RX UE 604 (also described as a destination) is in active time. The destination, for unicast, monitors the resource pool in active time. The destination who has interest in the service for a groupcast or a broadcast service, monitors the resource pool in active time. In an embodiment, the UE determines that the destination is in the active time if: (1) the on-duration timer of the destination is running or (2) the inactivity timer of the destination is running or (3) the retransmission timer of the destination is running.

In an embodiment, the SCI in a sidelink communication will indicate resources reserved by UE, the UE can determine that the destination is in active time in one of following resources:

the resource/initial transmission resource/retransmission resource/period resource is indicated by SCI associate to the destination the resource/initial transmission resource/retransmission resource/period resource is indicated by immediate last SCI associate to the destination.

the resource/initial transmission resource/retransmission resource/period resource is indicated by prior SCI associate to the destination.

In further embodiment of any of the above conditions, for a period resource, the active time includes first N period resources indicated by the SCI associated to the destination are considered, N can be an any integer. In another embodiment, the active time includes the period resource in the current DRX cycle indicated by SCI associated with the destination is considered.

In further embodiment, any of the above conditions only work if a feedback enable is provided. In another embodiment, any of the above conditions are met if the UE receives a feedback associated with the SCI from a peer SCI. In further embodiment, the conditions are met with a SCI that has a HARQ ACK or NACK.

In an embodiment, when the PSSCH transmission is feedback disabled, the TX UE would not consider transmission reliability and whether the RX UE received the SCI or data successfully. Here, the TX UE can still determine whether the destination if in active time when transmission occurs if allowed or enabled by a specification configuration. In an embodiment, the configuration includes whether a specific PQI/QoS/DRB/logical channel/MAC CE/destination/UE/priority/resource pool is allowed to determine whether destination is in active time when the MAC PDU is feedback disabled or HARQ only NACK.

In an embodiment, if the MAC PDU associated with the SCI does not include the data of PQI/QoS/DRB/logical channel/MAC CE/destination/UE/priority that is not allowed to determine whether destination is in active time when the MAC PDU is feedback disabled or HARQ only NACK, the UE can determine the destination in active time according to any of the preceding conditions. In an embodiment, if the MAC PDU associated with the SCI only includes the data of PQI/QoS/DRB/logical channel/MAC CE/destination/UE/priority to determine that that is allowed to determine whether destination is in active time when the MAC PDU is feedback disabled or HARQ only NACK, the UE can determine the destination is inactive according to the preceding conditions. In an embodiment, the UE determines that the destination is in active time according to the preceding conditions when the resource pool is allowed to be used to determine the destination in active time. In a further embodiment, the configuration includes a priority threshold and if logical channel priority within the MAC PDU associated with the SCI is higher than the threshold, the UE can determine the destination in active time according to any of the preceding conditions.

In an embodiment, for an Uu interface, a DRX command MAC CE and Long DRX Command MAC CE are used to control switching of long/short DRX cycles.

In uu interface, DRX Command MAC CE and Long DRX Command MAC CE are used to control switching of long/short DRX cycle as shown in following:

```
1>   if a DRX Command MAC CE is received:
   2>   if the Short DRX cycle is configured:
      3>   start or restart drx-ShortCycleTimer for each DRX group in
the first symbol after the end of DRX Command MAC CE reception;
         3>   use the Short DRX cycle for each DRX group.
      2>   else:
         3>   use the Long DRX cycle for each DRX group.
1>   if a Long DRX Command MAC CE is received:
   2>   stop drx-ShortCycleTimer for each DRX group;
   2>   use the Long DRX cycle for each DRX group.
```

In an embodiment, the same MAC CE may be reused in a sidelink DRX. The TX UE will be scheduled by gNB and, considering gNB needs to know whether the peer UE is in active time to schedule suitable resources for TX UE. In an embodiment, after the TX UE sends a DRX command MAC CE or long DRX command MAC CE to a peer UE, the TX UE also indicates the transmitting of a DRX command MAC CE or long DRX command MAC CE to gNB. In an embodiment, after TX UE sends the DRX command MAC CE or long DRX command MAC CE to peer UE, the TX UE sends a DRX command MAC CE or long DRX command MAC CE to gNB. In an embodiment, after the TX UE sends the DRX command MAC CE or long DRX command MAC CE to peer UE, the TX UE sends DRX command MAC CE or long DRX command MAC CE and corresponding destination identity of peer UE to gNB.

Figure 7:
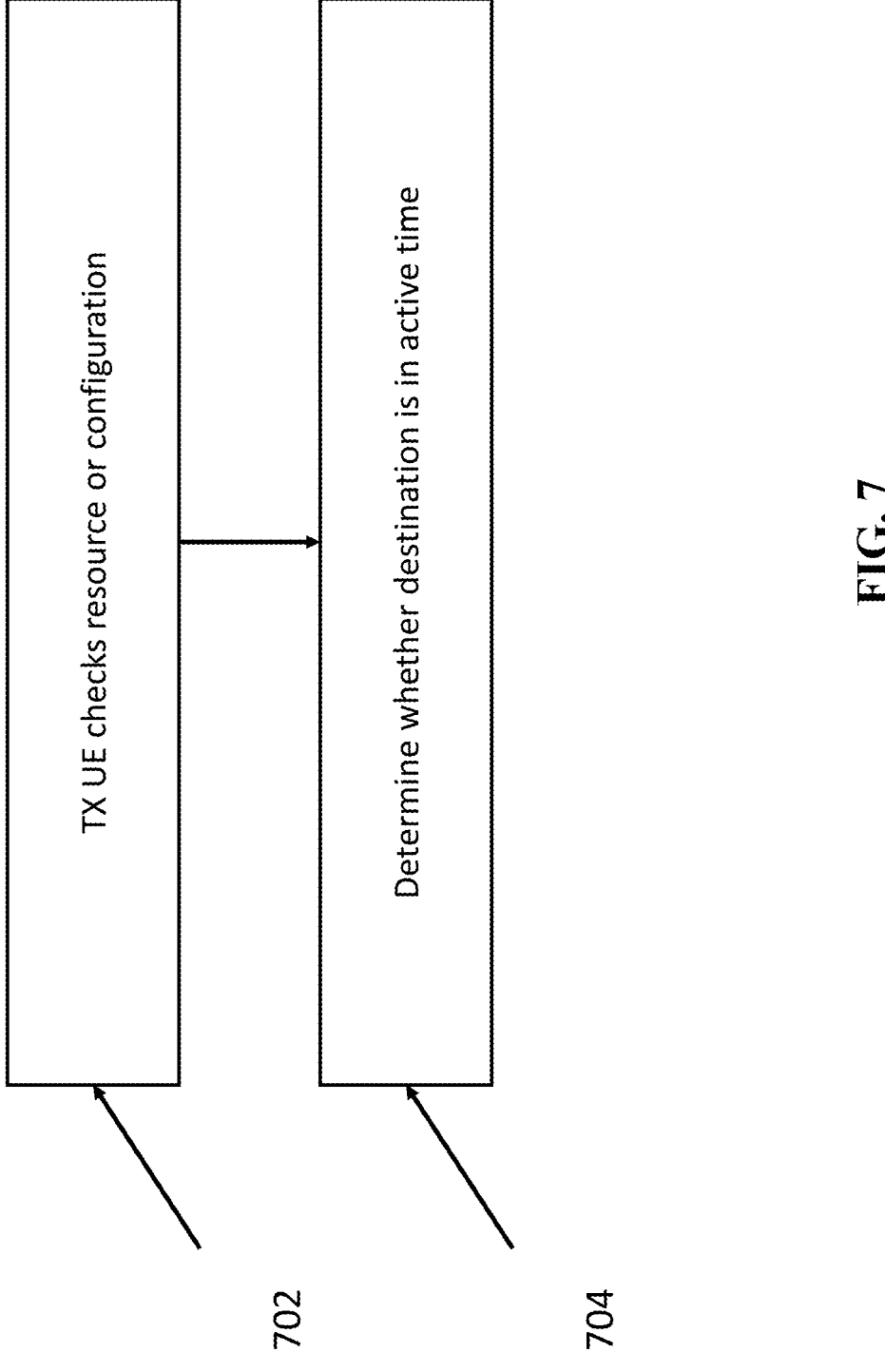
FIG. 7 illustrates a flowchart to for an TX UE to determine if a RX UE is in active time.

FIG. 7 illustrates a flowchart to for an TX UE to determine if a RX UE is in active time. In step 702, the TX UE checks a certain resource as indicated in the embodiments of FIG. 6. In step 704, according to that check, the TX UE determines whether the RX is in active time.

Figure 8:
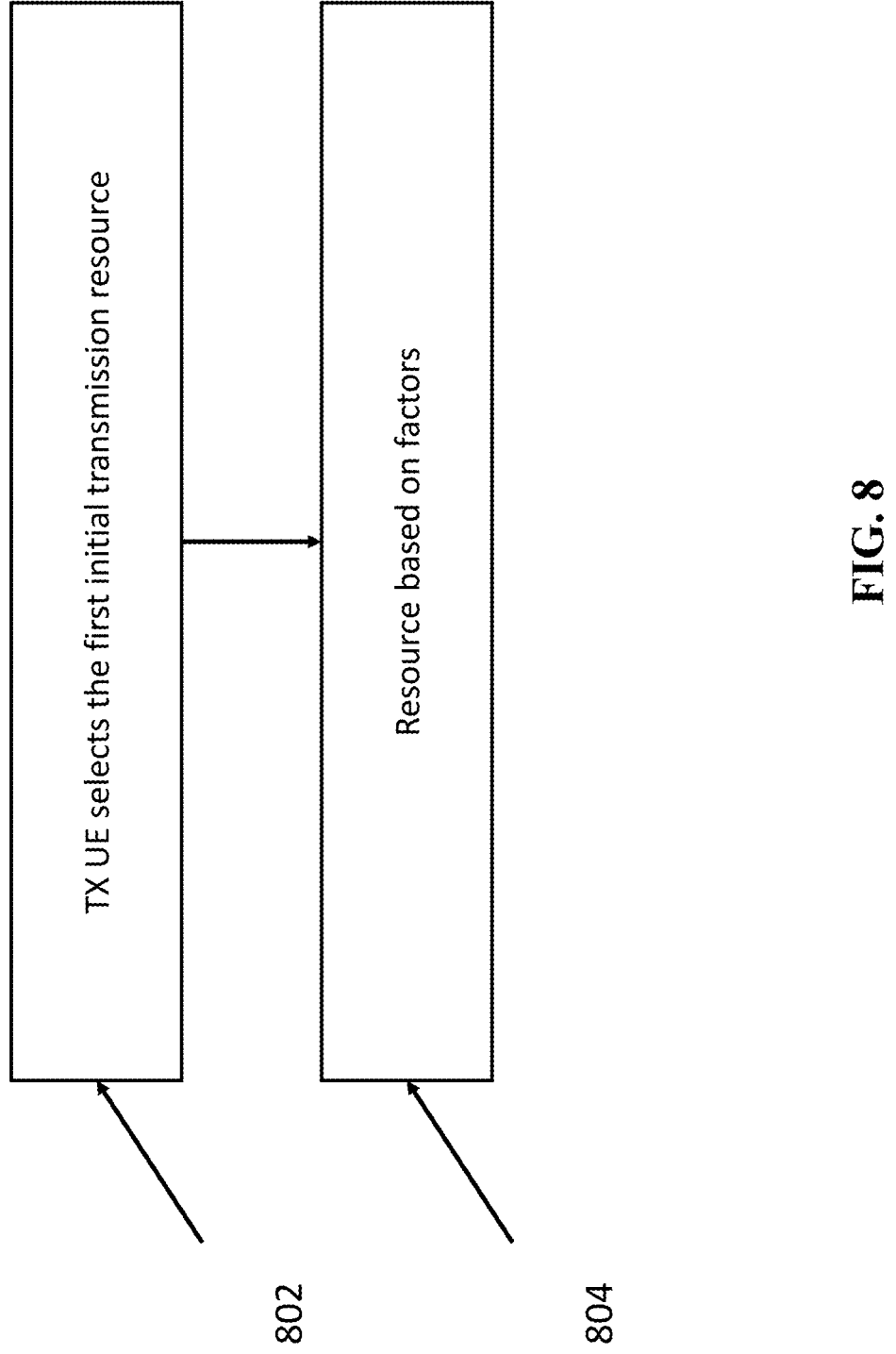
FIG. 8 illustrates the selection of an initial transmission resource.

FIG. 8 illustrates the selection of an initial transmission resource. In step 802, the TX UE selects the first initial transmission resource and, as indicated in step 804, the resource is selected based on certain factors. When the DRX is configured, the TX UE selects the resource on which the RX UE is in active time. In an embodiment, the resources on which any destination is not in active time are excluded from the resources indicated by the physical layer. In further embodiment, the initial transmission resource is selected randomly based on a transmission opportunity from the remaining resources. In another embodiment, the resource on which the any destination is not in active time of current DRX cycle is excluded from the resources indicated by the physical layer. In another embodiment, the resources on which any destination is in active time are selected as the first initial transmission resource. In another embodiment, the initial transmission resources are selected according to the DRX configuration of any destination. In another embodiment, the UE prior selects the initial transmission resources on which any destination is in active time. In another embodiment, the UE prior selects the resource by ensuring the following period resources spaced by the resource reservation interval is in the active time of any destination. In an embodiment, the resources on which the destination with highest priority logical channel is not in active time are excluded from the resources indicated by the physical layer. In further embodiment, resources are randomly selected based on transmission opportunity from the remaining resources. In another embodiment, the resources on which the destination with highest priority logical channel that is not in active time of the current DRX cycle is excluded from the resources indicated by the physical layer. In another embodiment, the resources on which the destination with highest priority logical channel is in active time are selected. In another embodiment, the resources are selected according to the DRX configuration of the destination with highest priority logical channel. In another embodiment, the UE pre-selects the resources on which the destination with highest priority logical channel is in active time. In another embodiment, UE pre-selects the resource by ensuring the following period resources spaced by the resource reservation interval is in the active time of the destination with highest priority logical channel.

Figure 9:
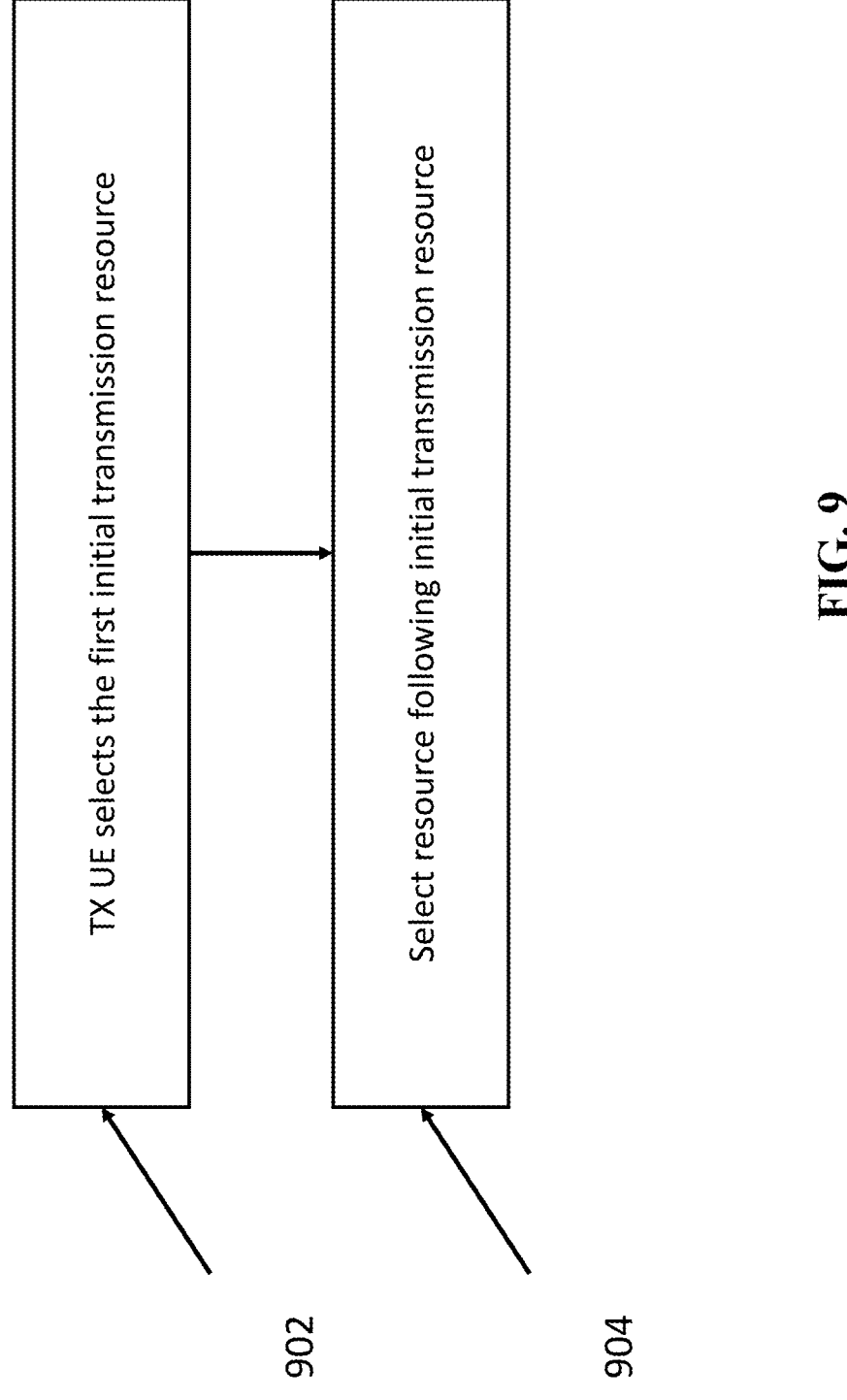
FIG. 9 illustrates the selection of the resource following the initial transmission resource.

FIG. 9 illustrates the selection of the resource following the initial transmission resource. In step 902, the TX UE selects the first initial transmission resource. In step 904, the resource following the initial transmission resource is selected. In an embodiment, the resource on which the any destination is not in active time is excluded from the resources indicated by the physical layer. In another embodiment, the resource on which the a destination is not in active time of current DRX cycle from the resources indicated by the physical layer is excluded. In further embodiment, a set of periodic resources spaced by the resource reservation interval from the remaining resources are randomly selected. In another embodiment, a set of periodic resources spaced by the resource reservation interval on which any destination is in active time are selected. In another embodiment, a set of periodic resources spaced by the resource reservation interval according to the DRX configuration of any destination are selected. In another embodiment, the UE prior selects a set of periodic resources spaced by the resource reservation interval on which any destination is in active time. In another embodiment, the resource on which the destination with highest priority logical channel is not in active time from the resources indicated by the physical layer are excluded. In another embodiment, the resource on which the a destination with highest priority logical channel is not in active time of current DRX cycle from the resources indicated by the physical layer is excluded. In further embodiment, a set of periodic resources spaced by the resource reservation interval from the remaining resources are randomly selected. In another embodiment, a set of periodic resources spaced by the resource reservation interval on which any destination with highest priority logical channel is in active time are selected. In another embodiment, a set of periodic resources spaced by the resource reservation interval according to the DRX configuration of any destination with highest priority logical channel are selected. In another embodiment, the UE prior select a set of periodic resources spaced by the resource reservation interval on which any destination with highest priority logical channel is in active time.

In an embodiment, the UE selects a retransmission resource. In an embodiment, the resources are selected according to the DRX configuration of any destination. In another embodiment, the resources on which any destination is in active time are selected. In another embodiment, UE prior select the resources on which any destination is in active time.

In an embodiment, the UE selects a destination associated to one of unicast, groupcast and broadcast, having at least one of the MAC CE and the logical channel with the highest priority, among the logical channels that satisfy all the following conditions and MAC CE(s), if any, for the SL grant associated to the SCI: if the DRX is configured, the destination of the logical channel or MAC CE is in active time; or if DRX is configured, the logical channel or MAC CE belongs to the destination that is in active time.

In an embodiment, "the destination is in active time" refers to:

1. for unicast, the destination is RX UE, the active time means RX UE will monitor the resource pool/PSCCH/PSSCH.
2. for groupcast and broadcast, the destination represents a groupcast or broadcast service, the active time means the RX UE who interests the service with the destination will monitors the resource pool/PSCCH/PSSCH.

Figure 10:
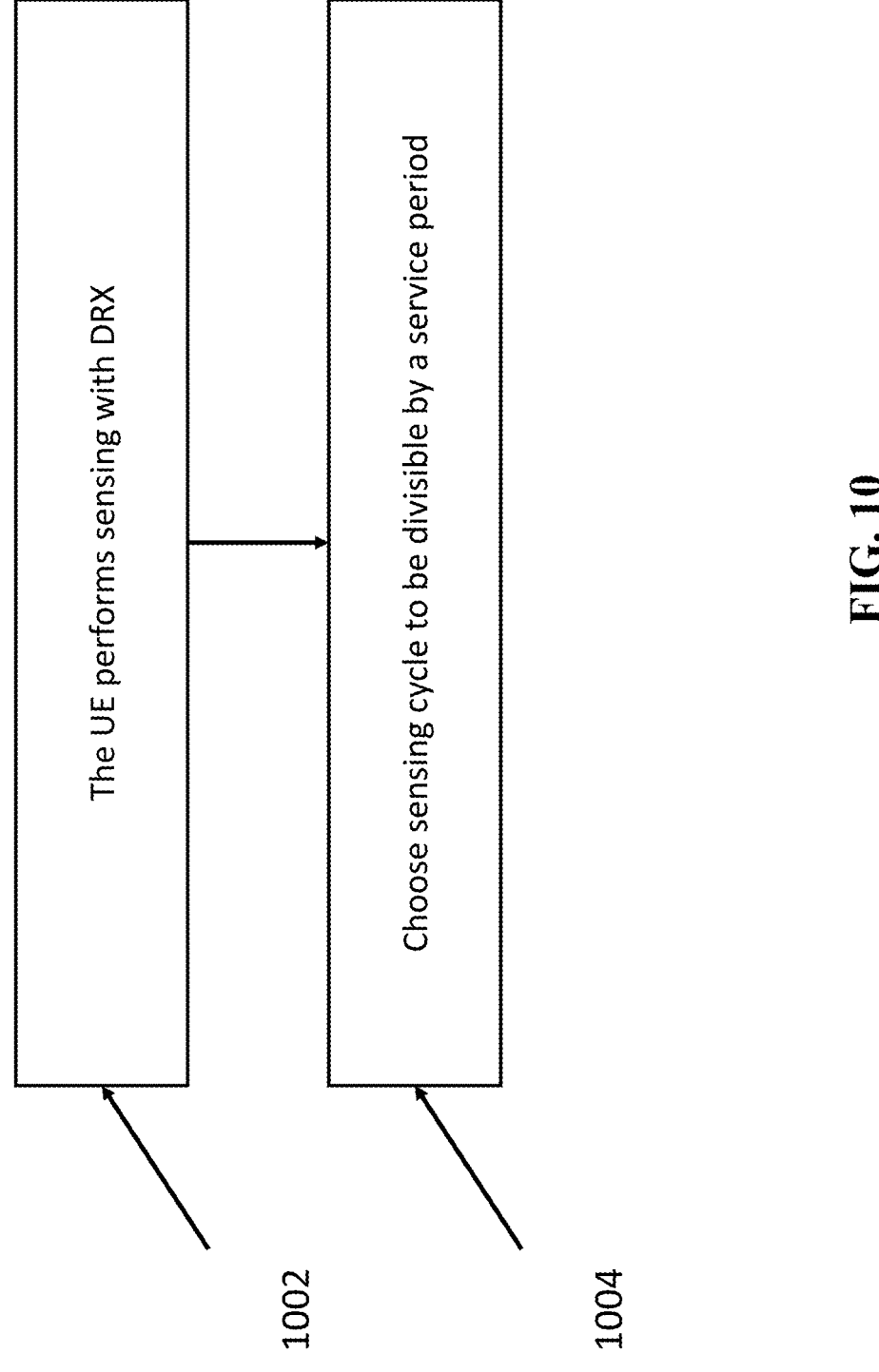
FIG. 10 illustrates a flowchart where the UE selects the DRX cycle when the UE performs normal sensing.

FIG. 10 illustrates a flowchart where the UE selects the DRX cycle when the UE performs normal sensing. In step 1002 the UE performs sensing with DRX. In an embodiment, the sensing is normal sensing. In an embodiment, the sensing is a partial sensing with partial sensing cycle equals to DRX cycle and Y subframes equals to DRX active time. As shown in step 1004, to avoid resource collision, partial sensing cycle is divisible by a resource reservation period (or vice versa). In an embodiment, to avoid resource collision when DRX is configured, the DRX cycle is divisible by resource reservation period or vice versa.

In an embodiment, NAS layer provides the DRX cycle/configuration to AS layer. In this case, AS layer provides the resource reservation period list configured for TX resource pool to NAS layer. In another embodiment, the AS layer provides the TX resource pool including resource reservation period configuration to NAS layer. In an embodiment, the UE determines the DRX cycle/configuration according to the PQI/QoS information and/or resource reservation period list configured for resource pool, no matter whether the NAS layer or AS layer determines the DRX cycle/configuration. In an embodiment, when the UE determines the DRX cycle, the DRX cycle is divisible by resource reservation period or vice versa. In an embodiment, when the UE determines the DRX cycle, for the case multiple resource reservation period are supported for a specific resource pool, the DRX cycle is divisible by some of resource reservation period and/or another resource reservation period can be divisible by the DRX cycle, Exp: resource reservation period list is [2,5,10,100], the cycle is 50, 50 is a multiple or divisor of 2,5,10, 100 is a multiple or divisor of 50. In an embodiment, when the UE determines the DRX cycle, the DRX on duration timer is equal or larger than the resource reservation period configured for the resource pool. In an embodiment, if the DRX is used, the resource reservation period which is not divisible by DRX cycle is not be selected. In an embodiment, if the DRX is used, the resource reservation period which is not divisible by DRX cycle or vice versa is not selected. In an embodiment, if DRX is used, the UE selects the resource pool in which resource reservation period is a multiple or divisor of DRX cycle or vice versa.

Figure 11:
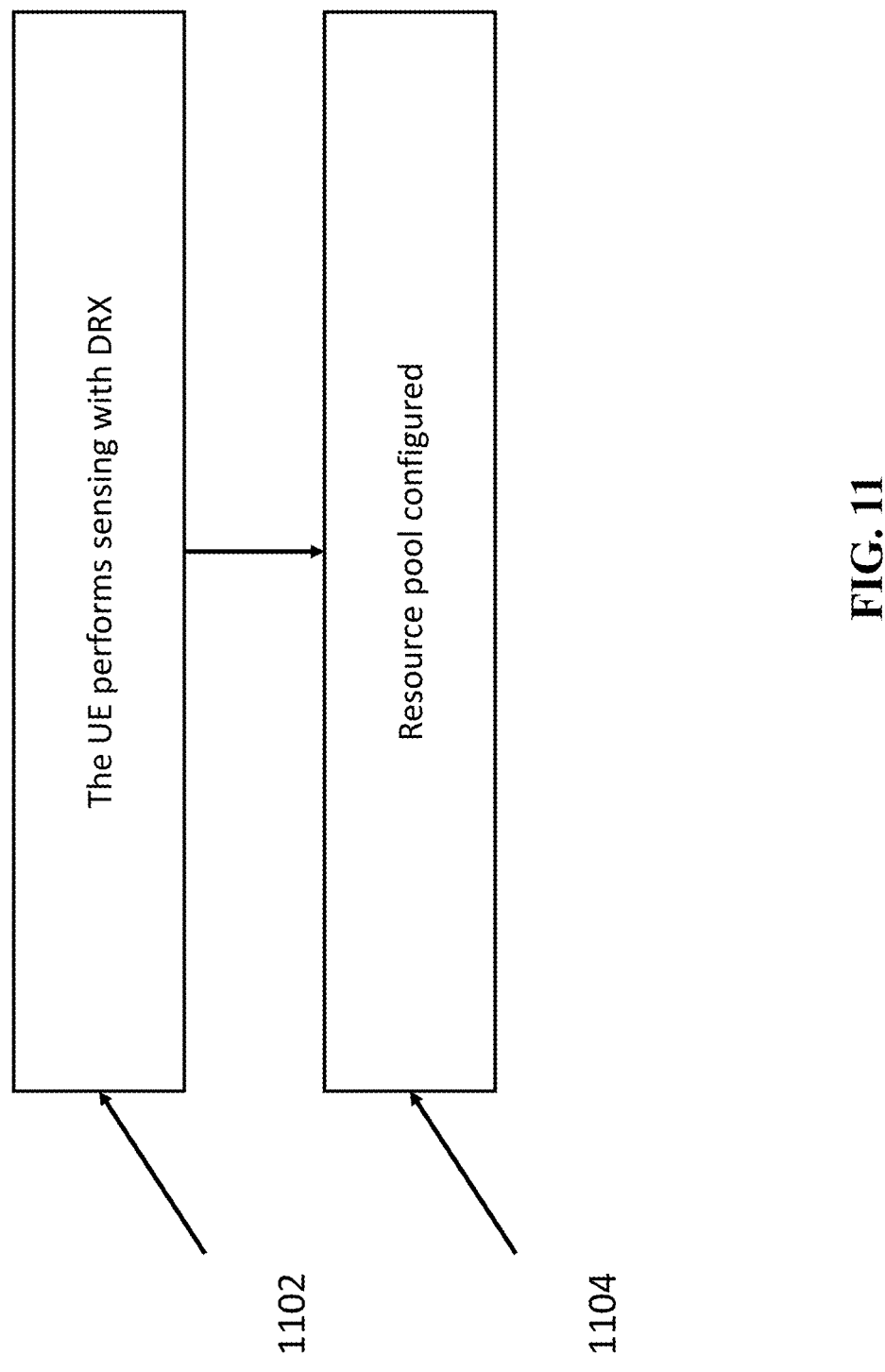
FIG. 11 illustrates a flowchart of performing partial sensing.

FIG. 11 illustrates a flowchart of performing partial sensing. In step 1102, the UE select DRX configuration or partial sensing parameters. As shown in step 1104, the UE performs sensing partial sensing.

In one embodiment, partial sensing parameters include: cycle, or number of sensing resource within the cycle, or a bitmap indicate which cycle needs to be sensed.

In one embodiment, every resource pool is configured with a resource reservation period list and every resource pool will also be configured with a partial sensing parameters/a list of partial sensing parameters to be used for sensing. After UE select resource pool, corresponding partial sensing cycle are also selected.

In one embodiment, when the UE is configured with a mapping between resource reservation period and partial sensing parameters, the UE selects a list of partial sensing parameters, each of which works for every resource reservation period. In one embodiment, when the UE is configured with a mapping between resource reservation period and a list partial sensing parameters, the UE selects partial sensing parameters can be mapped to all selected period. In one embodiment, when the UE is configured with a list of partial sensing parameters, select the partial sensing parameters with partial sensing cycle that is a multiple or divisor of resource reservation period with in resource reservation period list and/or the other resource reservation period is a multiple or divisor of the partial sensing cycle. Exp: period list is [2,5,10,100], the partial sensing cycle 50 is selected, 50 is a multiple or divisor of 2, 5, 10, 100 is a multiple or divisor of 50.

In an embodiment, when the DRX is configured, the UE selects partial sensing parameters according to DRX configuration. In an embodiment, when the DRX is configured, the UE selects the DRX configuration according to partial sensing parameters. In an embodiment, when the DRX is configured, the UE selects partial sensing cycle according to DRX cycle. In an embodiment, when the DRX is configured, the UE selects DRX cycle according to partial sensing cycle. In an embodiment, when the DRX is configured, the UE selects a partial sensing cycle that is a multiple or divisor of DRX cycle or vice versa. In another embodiment, when the DRX is configured, the UE selects DRX cycle that DRX cycle is a multiple or divisor of partial sensing cycle or vice versa. In an embodiment, when the DRX is configured, if the UE select a list of partial sensing cycle, the UE selects DRX cycle that some partial sensing cycle is a multiple or divisor of DRX cycle and/or the DRX cycle is a multiple or divisor of the other partial sensing cycle. In an embodiment, the UE is configured to perform DRX and partial sensing simultaneously, the sensing resources defined in partial sensing should be covered by DRX active time.

In one embodiment, if DRX active time can not cover partial sensing resource, UE is configured to enable or disable whether UE is allowed to sensing in partial sensing slot on which UE is non-active time. In further embodiment, the configuration is a priority threshold, if priority of logical channel is higher than the threshold, the UE is allowed to sensing in non-active time. In further embodiment, the configuration is configured per-UE, per-RB, per-destination, per-resource pool, per-logical channel, per priority.

In one embodiment, UE is configured to enable or disable whether UE is allowed sensing when UE is in active time. In one embodiment, UE is configured to enable or disable whether UE is allowed sensing when UE is in active time but out of sensing resource defined in partial sensing parameters. In further embodiment, the configuration is a priority threshold, if priority of logical channel is higher than the threshold, the UE is allowed sensing in non-active time. In further embodiment, the configuration is configured per-UE, per-RB, per-destination, per-resource pool, per-logical channel, per priority. In another embodiment, the UE is allowed sensing when UE is in non-active time or when transmission triggered timer/retransmission timer is running if the resource sensed in on-duration timer is not enough to use.

Figure 12:
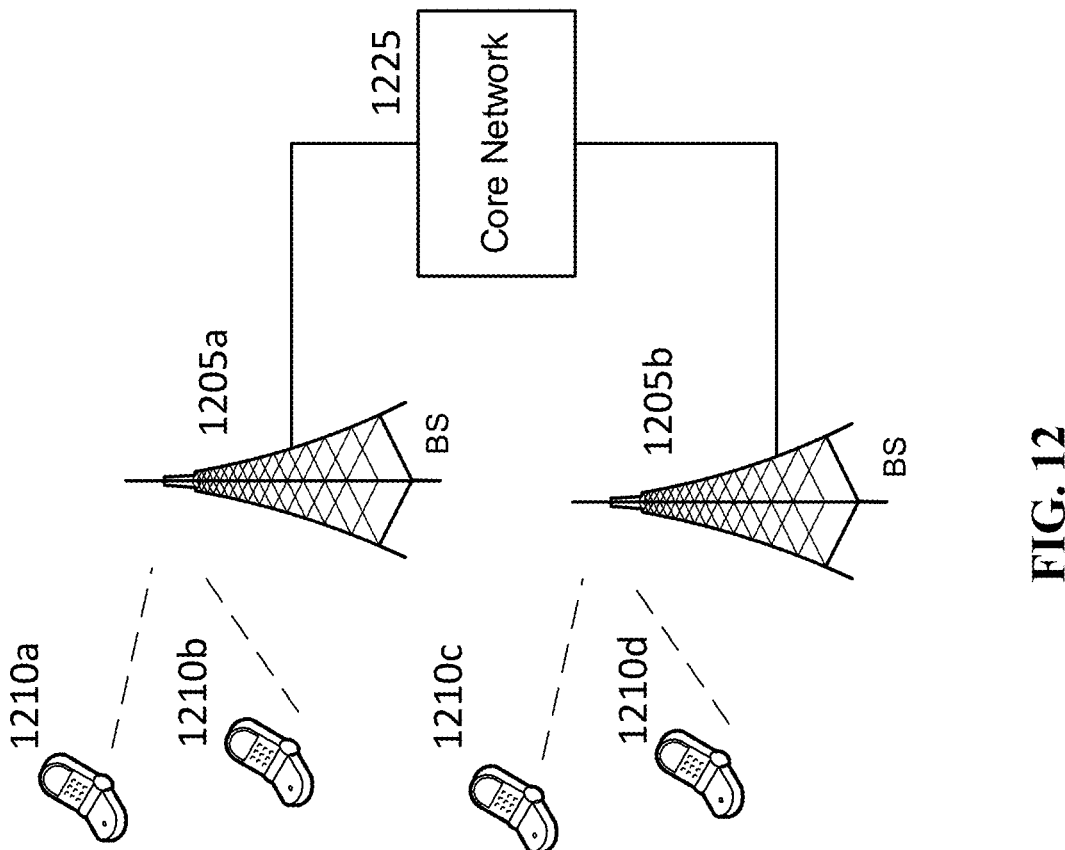
FIG. 12 shows an example of a wireless communication system where techniques in accordance with one or more embodiments of the present technology can be applied.
Figure 12:
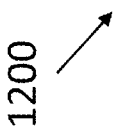

In an embodiment, to ensure the QoS of L3 relay, the relay UE forwards the data according to the mapping of PC5 QoS flow and Uu QoS flow. The QFI exists in the SDAP PDU. In an embodiment, for the UE using sidelink relay, PFI is mandatory exits in SDAP PDU. In an embodiment, for UE using sidelink relay, the QFI is mandatory exists in the SDAP PDU. In an embodiment, for UE using sidelink relay, the DRB is mandatory configured with the presence of SDAP PDU. In an embodiment, for UE using sidelink relay, the SL-DRB is mandatory configured with the presence of SDAP PDU. In an embodiment, for UE using sidelink relay, the DRB used for forward remote UE's data is mandatory configured with the presence of SDAP PDU. In an embodiment, for the UE using the sidelink relay, the SL-DRB associated with remote UE is mandatory configured with the presence of SDAP PDU. In an embodiment, if the SL-DRB used for the sidelink relay, the SL SDAP data is constructed with the PDU with the SDAP header. In an embodiment, the DRB used for the sidelink relay, the SL SDAP data PDU with SDAP header FIG. 12 shows an example of a wireless communication system 700 where techniques in accordance with one or more embodiments of the present technology can be applied. A wireless communication system 1200 can include one or more base stations (BSs) 1205a, 1205b, one or more wireless devices 1210a, 1210b, 1210c, 1210d, and a core network 1225. A base station 1205a, 1205b can provide wireless service to wireless devices 1210a, 1210b, 1210c and 1210d in one or more wireless sectors. In some implementations, a base station 1205a, 1205b includes directional antennas to produce two or more directional beams to provide wireless coverage in different sectors.

The core network 1225 can communicate with one or more base stations 1205a, 1205b. The core network 1225 provides connectivity with other wireless communication systems and wired communication systems. The core network may include one or more service subscription databases to store information related to the subscribed wireless devices 1210a, 1210b, 1210c, and 1210d. A first base station 1205a can provide wireless service based on a first radio access technology, whereas a second base station 1205b can provide wireless service based on a second radio access technology. The base stations 1205a and 1205b may be co-located or may be separately installed in the field according to the deployment scenario. The wireless devices 1210a, 1210b, 1210c, and 1210d can support multiple different radio access technologies. The techniques and embodiments described in the present document may be implemented by the base stations of wireless devices described in the present document.

Figure 13:
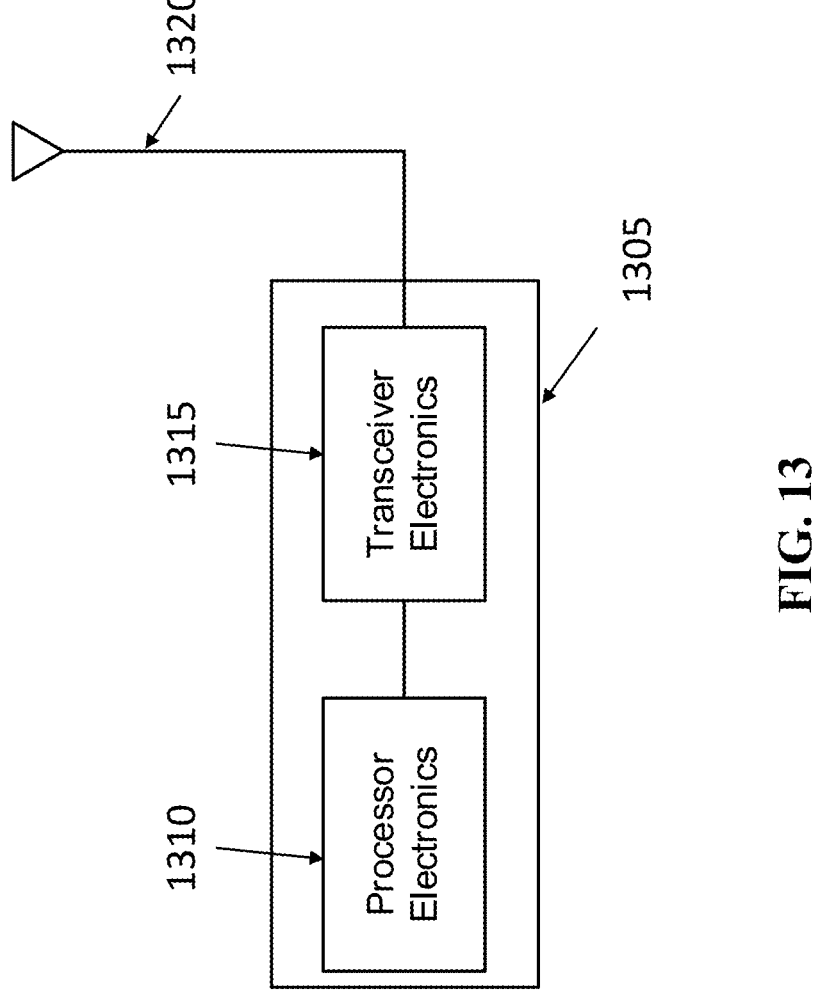
FIG. 13 is a block diagram representation of a portion of a radio station in accordance with one or more embodiments of the present technology can be applied.

FIG. 13 is a block diagram representation of a portion of a radio station in accordance with one or more embodiments of the present technology can be applied. A radio station 1305 such as a base station or a wireless device (or UE) or MT can include processor electronics 1310 such as a microprocessor that implements one or more of the wireless techniques presented in this document. The radio station 1305 can include transceiver electronics 1315 to send and/or receive wireless signals over one or more communication interfaces such as antenna 1320. The radio station 1305 can include other communication interfaces for transmitting and receiving data. Radio station 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the radio station 1305. In some embodiments, the radio station 1305 may be configured to perform the methods described herein.

It will be appreciated that the present document discloses techniques that can be embodied in various embodiments and configurations. It should be understood that concepts from some embodiments can be used for other embodiments. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. An information transmission method comprising:
determining whether a destination is in an active time according to a period resource indicated by a Side Link Control Information (SCI) associated with the destination;

selecting, by a wireless device, at least one initial transmission resource on which the destination is in the active time; and using, by the wireless device, the selected at least one initial transmission resource for the sidelink communication.

2. The method according to claim 1, wherein the period resource further comprises first N period resources indicated by the SCI associated with the destination, wherein the first N period resources are used for the determining.

3. The method according to claim 1, wherein the period resource comprises a period resource in a current Discontinuous Reception (DRX) cycle that is indicated by the SCI associated with the destination, the period resource in the current DRX is used for the determining, wherein the period resource indicates at least one slot or subframe associated with the destination.

4. The method according to claim 1, wherein the determining is performed for a SCI with a feedback enable, enabling the destination to receive a feedback associated with the SCI, wherein the feedback comprises at least one of Hybrid Automatic Repeat Request (HARQ) feedback, HARQ ACK or NACK or Media Access Control Control Element (MAC CE), RRC signaling, or an indicator indicating that the destination received the SCI successfully.

5. The method according to claim 1, wherein the determining is performed for a SCI with a Hybrid Automatic Repeat Request (HARQ) ACK or NACK.

6. The method according to claim 1, wherein a Physical Sidelink Shared Channel (PSSCH) transmission is feedback disabled for the wireless device to disregard transmission reliability or disregard whether the destination received a Side Link Control Information (SCI) successfully.

7. The method according to claim 6, further comprising: determining whether the destination is in the active time according to a specification configuration when a Media Access Controller (MAC) Protocol Data Unit (PDU)'s feedback is disabled or only NACK, the specification configuration includes whether a specific PC5 QoS Identifier (PQI) or Quality of Service (QoS) or Data Radio Bearers (DRB) or logical channel or Media Access Control Control Element (MAC CE) or destination or User Equipment (UE) or priority or a resource pool is allowed to do so.

8. The method according to claim 1, wherein the determining is performed if a Media Access Controller (MAC) Protocol Data Unit (PDU) associated with the SCI only includes data of QoS Identifier (PQI) or Quality of Service (QoS) or Data Radio Bearers (DRB) or logical channel or Media Access Control Control Element (MAC CE) or destination or User Equipment (UE) or priority that is allowed to determine the destination in the active time.

9. The method according to claim 1, wherein a resource pool indicates the destination in the active time based on at least one preceding condition when the resource pool is allowed to be used to determine the destination in the active time.

10. The method according to claim 1, wherein the determining is performed if a configuration includes a priority threshold, and wherein a logical channel priority within a Media Access Controller (MAC) Protocol Data Unit (PDU) associated with the SCI is higher than the priority threshold.

11. The method according to claim 1, wherein selecting the at least one initial transmission resource excludes the resource where any destination is not in active time as indicated by physical layer resources.

12. The method according to claim 11, wherein selecting the at least one initial transmission resource is done randomly based on a transmission opportunity from remaining resources.

13. The method according to claim 1, wherein selecting the at least one initial transmission resource excludes the resource where any destination is not in the active time of a current discontinuous reception (DRX) cycle as indicated by the physical layer resources.

14. The method according to claim 1, further comprising:

selecting, by the wireless device, at least one retransmission resource on which the destination is in the active time.

15. The method according to claim 1, wherein selecting the at least one initial transmission resource is done according to a discontinuous reception (DRX) configuration of any destination.

16. The method according to claim 1, comprising selecting the at least one initial transmission resource where any destination is in active time.

17. The method according to claim 1, further comprising ensuring that following period resources spaced by a resource reservation interval is in the active time of any destination.

18. The method according to claim 1, further comprising excluding one or more resources on which the destination with a highest priority logical channel is not in active time from the one or more resources indicated by physical layer resources.

19. The method according to claim 18, wherein selecting the at least one initial transmission resource is done randomly based on a transmission opportunity from remaining resources.

20. A wireless device, comprising:

at least one processor configured to:

determine whether a destination is in an active time according to a period resource indicated by a Side Link Control Information (SCI) associated with the destination;

select at least one initial transmission resource on which the destination is in the active time; and use the selected at least one initial transmission resource for the sidelink communication.

* * * * *